(12) United States Patent
Nagabhushan et al.

(10) Patent No.: US 8,099,718 B2
(45) Date of Patent: Jan. 17, 2012

(54) METHOD AND SYSTEM FOR WHITELISTING SOFTWARE COMPONENTS

(75) Inventors: Gayathri Nagabhushan, Portland, OR (US); Ravi Sahita, Beaverton, OR (US); Hormuzd Khosravi, Portland, OR (US); Satyajit Grover, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1099 days.

(21) Appl. No.: 11/984,001

(22) Filed: Nov. 13, 2007

(65) Prior Publication Data
US 2009/0125885 A1 May 14, 2009

(51) Int. Cl.
*G06F 9/44* (2006.01)
(52) U.S. Cl. .......................... 717/130; 717/127; 717/131
(58) Field of Classification Search .......... 717/101–103, 717/120–133, 168–178
See application file for complete search history.

(56) References Cited

U.S. PATENT DOCUMENTS

| | | | |
|---|---|---|---|
| 5,301,287 A | 4/1994 | Herrell et al. |
| 5,312,673 A | 5/1994 | Dressler |
| 5,379,400 A | 1/1995 | Barakat et al. |
| 5,619,723 A | 4/1997 | Jones et al. |
| 5,634,043 A | 5/1997 | Self et al. |
| 5,687,370 A | 11/1997 | Garst et al. |
| 5,751,989 A | 5/1998 | Harrison |
| 5,926,549 A | 7/1999 | Pinkas |
| 5,944,821 A | 8/1999 | Angelo |
| 5,966,531 A | 10/1999 | Skeen et al. |
| 5,987,557 A | 11/1999 | Ebrahim |
| 5,991,881 A | 11/1999 | Conklin et al. |
| 5,999,723 A | 12/1999 | Nachenberg |
| 6,101,586 A | 8/2000 | Ishimoto et al. |
| 6,105,137 A | 8/2000 | Graunke et al. |
| 6,163,834 A | 12/2000 | Garcia et al. |
| 6,321,276 B1 | 11/2001 | Forin |
| 6,487,643 B1 | 11/2002 | Khare et al. |
| 6,496,847 B1 | 12/2002 | Bugnion et al. |
| 6,542,919 B1 | 4/2003 | Wendorf et al. |
| 6,553,438 B1 | 4/2003 | Coffman et al. |
| 6,567,897 B2 | 5/2003 | Lee et al. |
| 6,658,515 B1 | 12/2003 | Larson et al. |
| 6,671,791 B1 | 12/2003 | McGrath |

(Continued)

FOREIGN PATENT DOCUMENTS

EP 1316873 6/2003

(Continued)

OTHER PUBLICATIONS

Yoshihama et al., "WS-Attestation: Enabling Trusted Computing on Web Services", Oct. 2006, IBM Japan, pp. 1-26.*

(Continued)

*Primary Examiner* — Ted T Vo
(74) *Attorney, Agent, or Firm* — Blakely, Sokoloff, Taylor & Zafman LLP

(57) ABSTRACT

A method and system for whitelisting software components is disclosed. In a first operating environment, runtime information may be collected about a first loaded and executing software component. The collected information may be communicated to a second software component operating in a second operating environment that is isolated from the first operating environment. The collect runtime information may be compared with a validated set of information about the first software component. Other embodiments are described and claimed.

14 Claims, 4 Drawing Sheets

U.S. PATENT DOCUMENTS

| | | | |
|---|---|---|---|
| 6,684,305 | B1 | 1/2004 | Deneau |
| 6,738,882 | B1 | 5/2004 | Gau |
| 6,751,720 | B2 | 6/2004 | Barroso et al. |
| 6,751,737 | B1 | 6/2004 | Russell et al. |
| 6,760,787 | B2 | 7/2004 | Forin |
| 6,823,433 | B1 | 11/2004 | Barnes et al. |
| 6,832,257 | B1 | 12/2004 | Gamo |
| 6,931,540 | B1 | 8/2005 | Edwards et al. |
| 6,961,852 | B2 | 11/2005 | Craft |
| 6,996,551 | B2 | 2/2006 | Hellerstein et al. |
| 7,010,630 | B2 | 3/2006 | Pagan |
| 7,028,229 | B2 | 4/2006 | McGuire et al. |
| 7,093,295 | B1 | 8/2006 | Saito |
| 7,103,779 | B2 | 9/2006 | Kiehtreiber et al. |
| 7,225,325 | B2 | 5/2007 | Rhoades |
| 7,328,453 | B2 | 2/2008 | Merkle, Jr. et al. |
| 7,409,472 | B2 | 8/2008 | Iwatani et al. |
| 7,478,394 | B1 | 1/2009 | de Dinechin et al. |
| 7,506,122 | B1 | 3/2009 | Agesen et al. |
| 7,542,026 | B2 | 6/2009 | Pagan |
| 7,581,256 | B2 | 8/2009 | Cockerille et al. |
| 7,603,484 | B2 | 10/2009 | Dai et al. |
| 2001/0014157 | A1 | 8/2001 | Hashimoto et al. |
| 2002/0029308 | A1 | 3/2002 | Babaian et al. |
| 2002/0120871 | A1 | 8/2002 | Watkins et al. |
| 2002/0129212 | A1 | 9/2002 | Lee et al. |
| 2003/0005239 | A1 | 1/2003 | Dover |
| 2003/0005272 | A1 | 1/2003 | Nalawadi et al. |
| 2003/0037237 | A1 | 2/2003 | Abgrall et al. |
| 2003/0061540 | A1 | 3/2003 | Lee et al. |
| 2003/0097496 | A1 | 5/2003 | Gabryjelski |
| 2003/0135685 | A1 | 7/2003 | Cowan |
| 2003/0159055 | A1 | 8/2003 | Robbins et al. |
| 2003/0217250 | A1 | 11/2003 | Bennett et al. |
| 2003/0229794 | A1 | 12/2003 | Sutton et al. |
| 2003/0229808 | A1 | 12/2003 | Heintz et al. |
| 2003/0235310 | A1 | 12/2003 | Saito et al. |
| 2004/0030911 | A1 | 2/2004 | Isozaki et al. |
| 2004/0039924 | A1 | 2/2004 | Baldwin et al. |
| 2004/0044872 | A1 | 3/2004 | Scott |
| 2004/0153998 | A1 | 8/2004 | McGuire et al. |
| 2004/0221200 | A1 | 11/2004 | Armstrong et al. |
| 2004/0226009 | A1 | 11/2004 | Mese et al. |
| 2004/0268013 | A1 | 12/2004 | Pagan |
| 2005/0027988 | A1 | 2/2005 | Bodrov |
| 2005/0132122 | A1* | 6/2005 | Rozas ........................... 711/100 |
| 2005/0138417 | A1 | 6/2005 | McNerney et al. |
| 2005/0198051 | A1 | 9/2005 | Marr et al. |
| 2005/0213768 | A1 | 9/2005 | Durham et al. |
| 2005/0216577 | A1 | 9/2005 | Durham et al. |
| 2005/0278499 | A1 | 12/2005 | Durham et al. |
| 2005/0278563 | A1 | 12/2005 | Durham et al. |
| 2005/0289311 | A1 | 12/2005 | Durham et al. |
| 2005/0289542 | A1 | 12/2005 | Uhlig et al. |
| 2006/0021029 | A1 | 1/2006 | Brickell et al. |
| 2006/0026569 | A1 | 2/2006 | Oerting et al. |
| 2006/0047955 | A1 | 3/2006 | Prevost |
| 2006/0156005 | A1 | 7/2006 | Fischer et al. |
| 2006/0156398 | A1 | 7/2006 | Ross et al. |
| 2006/0161761 | A1 | 7/2006 | Schwartz et al. |
| 2006/0236125 | A1 | 10/2006 | Sahita et al. |
| 2006/0294596 | A1 | 12/2006 | Govindarajan et al. |
| 2007/0005935 | A1 | 1/2007 | Khosravi et al. |
| 2007/0005957 | A1 | 1/2007 | Sahita et al. |
| 2007/0005992 | A1 | 1/2007 | Schluessler et al. |
| 2007/0006175 | A1 | 1/2007 | Durham et al. |
| 2007/0006307 | A1 | 1/2007 | Hahn et al. |
| 2007/0094725 | A1* | 4/2007 | Borders ........................... 726/22 |
| 2007/0156999 | A1 | 7/2007 | Durham et al. |

FOREIGN PATENT DOCUMENTS

| | | |
|---|---|---|
| WO | WO-9847072 | 10/1998 |
| WO | WO-0142874 | 6/2001 |
| WO | WO 02/25428 | 3/2002 |

OTHER PUBLICATIONS

McCune et al., "Bump in Ether: A Framework for Securing Sensitive User Input", 2006, USENIX Annual Technical Conference, pp. 185-198.*

European Search Report for Application No. 08253698.8, dated Mar. 25, 2009.

International Search Report and Written Opinion from PCT/US/2005/022577 Nov. 24, 2005.

International Preliminary Report on Patentability from PCT/US/2005/022577 mailed Jan. 9, 2007.

"Windows Platform Design Notes: Standardizing Out-Of-Band Management Console Output and Terminal Emulation (VT-UTF8 and VT100+)", Oct. 24, 2001, 15 pages, http://download.microsoft.com/download/1/6/1/161ba512-40e2-4cc9-843a-923143f3456c/StandardizingOutOfBandManagementConsoleOutput090.doc.

Apple Computer, Inc., "Mac OS X ABI Mach-o File Format Reference", Mar. 8, 2006 64 pages (copyright 2003, 2006 Apple, Inc.).

Collins, "Intel's System Management Mode", 1999, 8 pages, http://www.rcollling.org/ddj/Jan97/Jan97.html.

Draheim, "AMD64/EM64T—The Coming Market", May 4, 2004, 5 pages, http://www2.informatik.hu-berlin.de/~draheim/article/em64t.html.

Duc, G. et al., "CryptoPage: An Efficient Secure Architecture with Memory Encryption, Integrity and Information Leakage Protection", Computer Security Applications COnference, ASCAC, 22nd Annual. Dec. 2006, pp. 483-492.

Grevstad, "CPU-Based Security: The NX Bit", Juniperimages, May 24, 2004, 3 pages.

Khosravi, Hormuzd M. et al., "Dynamic Generation of Integrity Manifest for Run-Time Verification of Software Program", U.S. Appl. No. 11/967,928, filed Dec. 31, 2007, 41 pages.

Levy, J. et al., "Hiding Your Wares: Transparently Retrofitting Memory Confidentiality into Legacy Applications", Communications, 2007. ICC, IEEE International Conference on Jun. 24-28, 2007, pp. 1368-1372.

Markatos et al., "User-Level DMA without Operating System Kernel Modification", Feb. 1-5, 1997, pp. 322-331; High Performance Computer ARchitecture, 1999, IEEE 3rd International Symposium.

Microsoft Corp., "Microsoft Portable Executable and Common Object File Format Specification", Revision 6.0, Feb. 1999, 77 pages.

Red Hat, Inc., "Red Hat Enterprise Linux 4: Using as, the Gnu Assembler", copyright 2004, 302 pages.

Sheveley, "Enhanced Virtualization on Intel Architecture-Based Servers", Technology@Intel Magazine, Apr. 2005, pp. 1-9.

The PC Guide, "Direct Memory Access (DMA) Modes and Bus Mastering DMA", Apr. 17, 2001; 3 pages; http://www.pcguide.com/ref/hdd/if/ide/modesDMA-c.html.

Tools Interface Standards (TIS), "Executable and Linkable Format (ELF)", Portable Formats Specification, Version 1.1, 262 pages; TIS Committee, Oct. 1993.

Uhlig, Rich, et al., "Intel Virtualization Technology", IEEE Computer Society, May 2005, pp. 48-56.

Wagle, Perry, "StackGuard: Simple Stack Smash Protection for GCC", Imunix, Inc. GCC Developers Summit 2003, (Aug. 2001), 243-256.

Webopedia, "Bus", Dec. 1, 2002, http://isp.webopedia.com/TERM/B/bus.html.

Webopedia, "DMA", Nov. 11, 2003, 2 pages, http://www.webopedia.com/TERM/DMA.html.

Webopedia, "Kernel", Mar. 12, 2002, 2 pages, http:..www.webopedia.com/TERM/k/kernel.html.

Yan, Chenyu, et al., "Improving COst, Performance, and Security of Memory Encryption and Authentication", Computer Architecture, 2006. ISCA, 33rd International Symposium, pp. 179-190.

Zhang, "Memory Management in JikesNode Operating System", 2005, A thesis submitted to the University of Manchester for the degree of Master of Science in the Faculty of Science and Engineering, pp. 1, 27 and 29.

* cited by examiner

METHOD AND SYSTEM FOR WHITELISTING SOFTWARE COMPONENTS

BACKGROUND OF THE INVENTION

Root-kits and other malware may avoid detection by security software operating on a software platform. Once established, the root-kit may observe user activity, circumvent user actions, and perform other malicious or undesired activities. Measuring an individual software entity may address integrity and presence checks of that software entity, but may not give any assurance that the software entity has not been circumvented.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
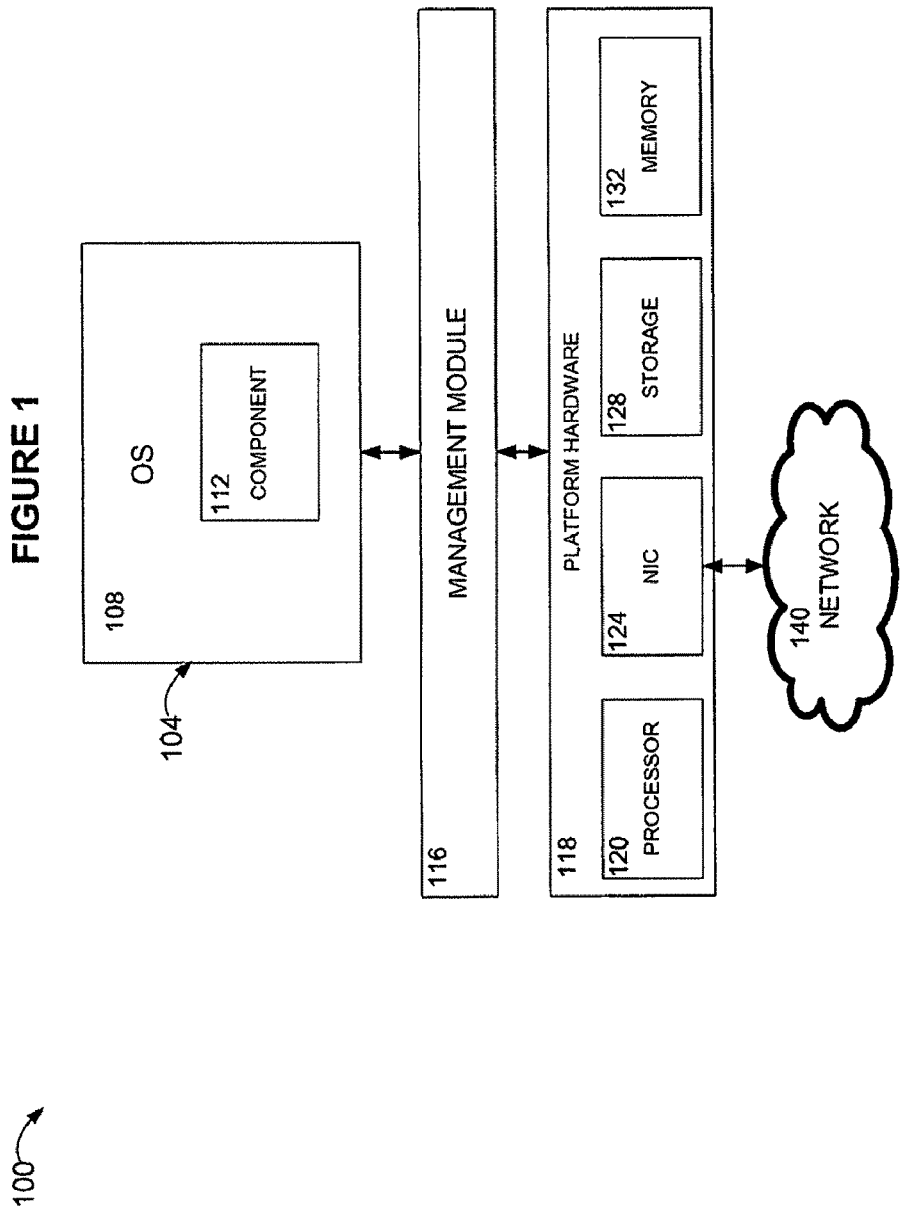
FIG. 1 is a schematic illustration of a computing platform according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

As used herein, the term "component" may refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as for example C++, Intel Architecture 64 bit (IA-64) executable code, etc. Further, components may be callable from other components or from themselves, and/or may be invoked in response to detected events or interrupts. For example, a component may be a software package, module or agent executed by one or more processors.

Embodiments of the invention may provide a method and system for whitelisting software components in an operating system environment. In one embodiment, in a first operating environment, runtime information may be collected about a first loaded and executing software component. The collected information may be communicated to a second software component operating in a second operating environment that is isolated from the first operating environment. The collected runtime information may be compared with a validated set of information about the first software component.

Reference is now made to FIG. 1, a schematic illustration of a computing platform 100 capable of implementing or executing whitelisting operating software components according to an embodiment of the invention. In some embodiments, computing platform 100 may include or may be, for example, a personal computer (PC), a desktop computer, a mobile computer, a laptop computer, a notebook computer, a terminal, a workstation, a server computer, a personal digital assistant (PDA) device, a network device, or other suitable computing device capable of hosting executing environment 104.

Although the invention is not limited in this respect, computing platform 100 may include for example an executing environment 104, management module 116, and platform hardware 118, which may include for example a processor 120, a network interface controller (NIC) 124, storage 128, and/or memory 132. Computing platform 100 may also be connected to a network 140 for communicating with external computing platforms and other devices. Network 140 may be a local area network (LAN), metropolitan area network (MAN), wide area network (WAN) or other similar network with communications links between two or more network nodes.

In some embodiments, execution environment 104 may host an executing operating system (OS) 108. OS 108 may be a software component configured to execute and control general operation of other components within the execution environment 104, such as for example a software component 112. In some instances, execution environment 104 may provide a virtual execution environment in which the components may operate. Alternatively, execution environment 104 may be non-virtualized.

In some embodiments, software component 112 may be a supervisory-level component such as, e.g. a kernel component. A kernel component may be or include services, such as for example a loader, a scheduler, a memory manager, and the like; extensions/drivers, such as for example for a network card, universal serial bus (USB) interface, a disk drive, and the like; or a service-driver hybrid, such as for example intrusion detectors to watch execution of code.

Management module 116 may arbitrate general component access to hardware or other resources such as for example one or more processors 120, NIC 124, storage 128 and/or memory 132. In some embodiments, the functions of management module 116 may vary according to whether OS 108 is virtualized.

Processor 120 may be or include for example a central processing unit (CPU), a digital signal processor (DSP), a microprocessor, a controller, a chip, a microchip, or any suitable multi-purpose or specific processor or controller. In some embodiments, for example, processor 120 may execute programming instructions or perform calculation operations which may be used in the operation of components on computing platform 100.

Storage 128 may include integrated and/or peripheral storage devices, such as for example disks and associated drives, USB storage devices, flash memory, read-only memory (ROM), non-volatile semiconductor devices or other suitable storage devices for storing persistent content to be used for the execution of components on platform 100. In some embodiments storage 128 may be a storage resource physically part of platform 100 or it may be accessible by, but necessarily part of, platform 100. For example, storage 128 may be accessed by platform 100 over network 140 via network controller 124.

Memory 132 may include, for example, one or more memories such as a random access memory (RAM), a ROM, a dynamic RAM (DRAM), a synchronous DRAM (SDRAM), a Flash memory, a volatile memory, a non-volatile memory, a cache memory, a buffer, a short term memory unit, a long term memory unit, or other suitable memory units for storing data and or components such as OS 108 and/or software component 112. In some embodiments, memory 132 may organize content stored therein into a number of groups of memory locations. These organizational groups, which may be fixed and/or variable sized, may facilitate virtual memory management if OS 108 is virtualized. Alternatively if OS 108 is not virtualized, memory 132 may have a different organizational structure.

Figure 2:
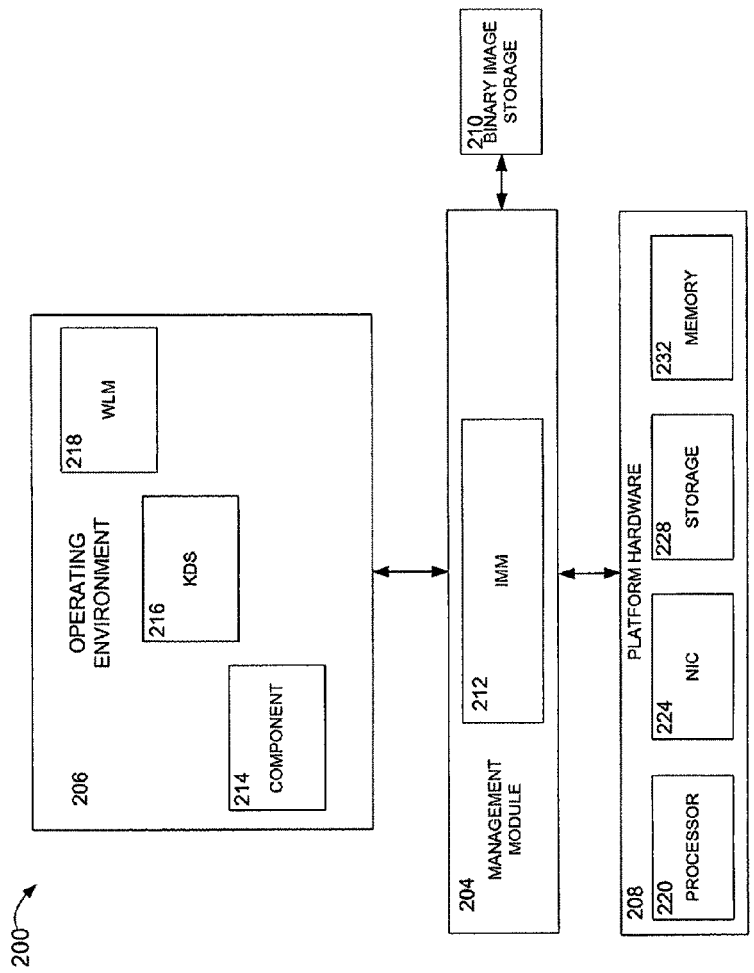
FIG. 2 is a representative illustration of a whitelisting architecture on a computing platform according to an embodiment of the invention.

Reference is now made to FIG. 2 which shows a whitelisting architecture on a computing platform 200 according to an embodiment of the invention. As used herein, whitelisting may refer for example to the process of verifying that a software element (such as for example a section of code, a component, module, agent, script, etc.) is safe to execute or use, e.g. is free from malware or other damage. In some embodiments, computing platform 200 may be similar to, and substantially interchangeable with, platform 100. Furthermore, elements described below may be similar to, and substantially interchangeable with, like-named elements described above and vice versa.

Computing platform 200 may include a management module 204 for managing an operating environment 206, a platform hardware 208, and a binary image storage 210. Management module 204 or portions of management module 204 may be executed independently from, may execute code independently from, and may be securely isolated from operating environment 206. In some embodiments, management module 204 may present or represent multiple abstractions and/or views of platform hardware 208, e.g. one or more processors 220, NIC 224, storage 228, and/or memory 232, to operating execution environment 206 as is known. Further, in some embodiments, management module 204 may include an operating execution environment that can execute instructions such as for example in firmware and may be for example a manageability engine. In these instances, operating environment 206 may be for example a native, traditional, or legacy, e.g. non-virtualized, OS environment Alternatively, management module 204 may be a virtual machine monitor (VMM) and operating environment 206 may be for example a virtual machine (VM) or guest OS. In these instances, management module 204 may manage VM access to hardware 208. Management module 204 may be implemented in software (e.g., as a stand-alone program and/or component of a host operating system, executed by one or more controllers or processors), hardware, firmware, and/or any combination thereof.

Management module 204 may include an integrity measurement manager (IMM) 212 for verifying the integrity of or validating characteristics of components operating in operating environment 206. To verify the integrity of an operating component, IMM 212 may compare a loaded and expected, e.g. authorized, service such as component 214 to a recorded image of the operating component that may be stored for example on-disk in for example binary image storage 210. The stored image may contain information about the component including for example code, data sections, external symbol tables, and relocation information. Other information about the component may also be included. IMM 212 may generate or extract an integrity manifest for the service from the image stored in binary image storage 210. An integrity manifest may be for example a summary description or listing of how a valid or legitimate version of the component should appear in memory at runtime, e.g. during execution. In some embodiments, the integrity manifest may be signed during generation to avoid any tampering or unauthorized modification and may thereby include a validated set of information for the service such as for example code and data section information, relocation information, symbol table information, and other information to verify the integrity of the manifest itself. An image of component 214 in memory such as for example memory 232 may be validated against this integrity manifest.

In some embodiments wherein operating environment 206 is virtualized, a Virtualized Technology Integrity Services (VTIS) component (not shown) may also be present in management module 204. The VTIS component may protect pages of memory in management module 204 containing integrity verified code or data that is part of a currently executing component such as component 214 of operating environment 206. To isolate protected data from operating environment 206, the VTIS component may have exclusive access to the integrity verified code or data. In some embodiments, components or modules that execute in an operating environment 206 may be able to register, e.g. be integrity verified, by the VTIS component upon loading or other such event.

In instances where operating environment 206 is virtualized, IMM 212 may execute in a VMM, e.g. management module 204. Alternatively, IMM 212 may execute in operating environment 206. For instances in which IMM 212 executes in operating environment 206, IMM 212 may be secured by management module 204 to assure that physical address spaces used by two or more operating environments 206 do not overlap. Further, IMM 212 may also register with the VTIS component of management module 204 on startup and be validated by the VTIS component.

In instances wherein operating environment 206 is nonvirtualized, IMM 212 may be implemented in firmware as part of a manageability engine.

Operating environment 206 may include one or more components executing within operating environment 206 such as component 214, kernel directory service (KDS) 216, and whitelisting manager (WLM) 218. Other components may also be included. Component 214 may be or include any software component executing in operating environment 206 such for as example a kernel service, a module, or driver. Malware such as for example a root-kit may infiltrate an operating environment 206 and may for example modify a component 214, divert, e.g., hook the proper execution of component 214, or even attempt to operate as a valid component of operating environment 206. Embodiments of the invention may secure a computing platform such as computing platform 200 by validating, checking, or whitelisting known components of operating environment 206 and validating all the interactions between these components and with the other entities on computing platform 206.

KDS 216 may be or include a component, e.g. an agent or service executing in the OS or guest OS for virtualized machines, and may be capable of listing components or services currently executing in operating environment 206 such as for example component 214. In some embodiments, KDS 216 may execute for example as a ring-0 service.

WLM 218 may be or include a component executing in the OS or guest OS for virtualized machines capable of collecting all information on the external references made by a single OS service or agent such as component 214 to other OS services or agents. In some embodiments, WLM 218 and IMM 212 may be combined into a single module, although other functional components may be used. Collecting all information on the external references made by a single OS service or agent may also be referred to herein as capturing an image of a component. WLM 218 may determine what information to collect by referring to the import table structure of the image for component 214 that is stored in binary image storage 210. The import table structure may be or include for example a list of imported function addresses into entry points that are exported by the component. WLM 218 may also refer to other stored image data.

To determine what components may be executing in operating environment 206, WLM 218 may communicate with KDS 216 via a buffer or shared memory. The shared memory may be a memory space in management module 204. For embodiments in which operating environment 206 is virtualized, e.g. a VM, and the shared memory may be buffered and protected by the VTIS component. For embodiments in which the operating environment is not virtualized, the shared memory may be buffered and accessible via a hardware interface such as for example a Host Embedded Controller Interface (HECI) or other interface for a manageability engine as is known.

Figure 3:
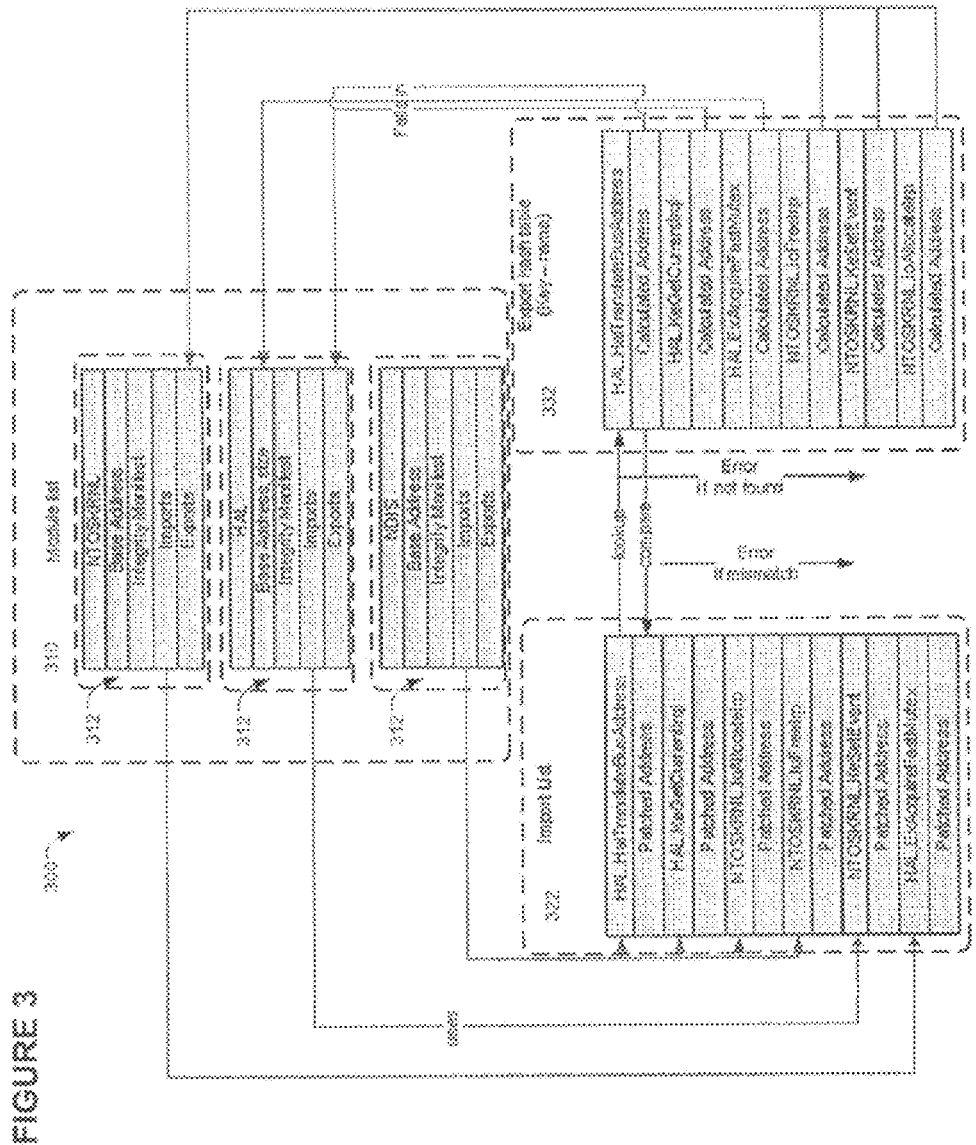
FIG. 3 is a representative illustration of a data structure of sample component images captured by a whitelisting service according to an embodiment of the invention.

Reference is now made to FIG. 3 which shows a representative illustration of a data structure 300 of sample component images that may be captured by WLM 218. FIG. 3 shows a listing 310 of components 312 that may be captured. As used herein, component 312 may be the same as or substantially similar to component 214 of FIG. 2. For each component 312, listing 310 may contain information including for example the component name, base address in memory, integrity manifest name, an import list 322 and an export list 332, e.g. an export hash table. Other information regarding component 312 may also be included. Import list 322 may be or include for example a list of addresses, references, or pointers to addresses used by component 312. Other information may also be included. Export list 332 may be or include for example a list of addresses, references, or pointers to addresses used by component 312. Other information may also be included.

Using information provided by KDS 216, WLM 218 and IMM 212 may operate in combination to verify the integrity of one or more operating components 214 by comparing a recorded image of the component(s) and corresponding data with a manifest extracted from a previously stored reference.

In some embodiments, after registration and/or verification of KDS 216 and WLM 218, verification may include for example three phases. In the first phase, the code and data sections of a component 214 may be compared to an integrity manifest and state data on import and export pointer addresses may be stored. In the second phase, this stored state data may be compared to import and export pointers in the integrity manifest. If the component passes the second phase, the component's interrupt handlers may be compared to the locations of other components or modules that have also passed the second phase of verification. If all three phases of verification are successful, the component's integrity may be verified. If not, an alert may be sent to for example a remote IT console.

Figure 4:
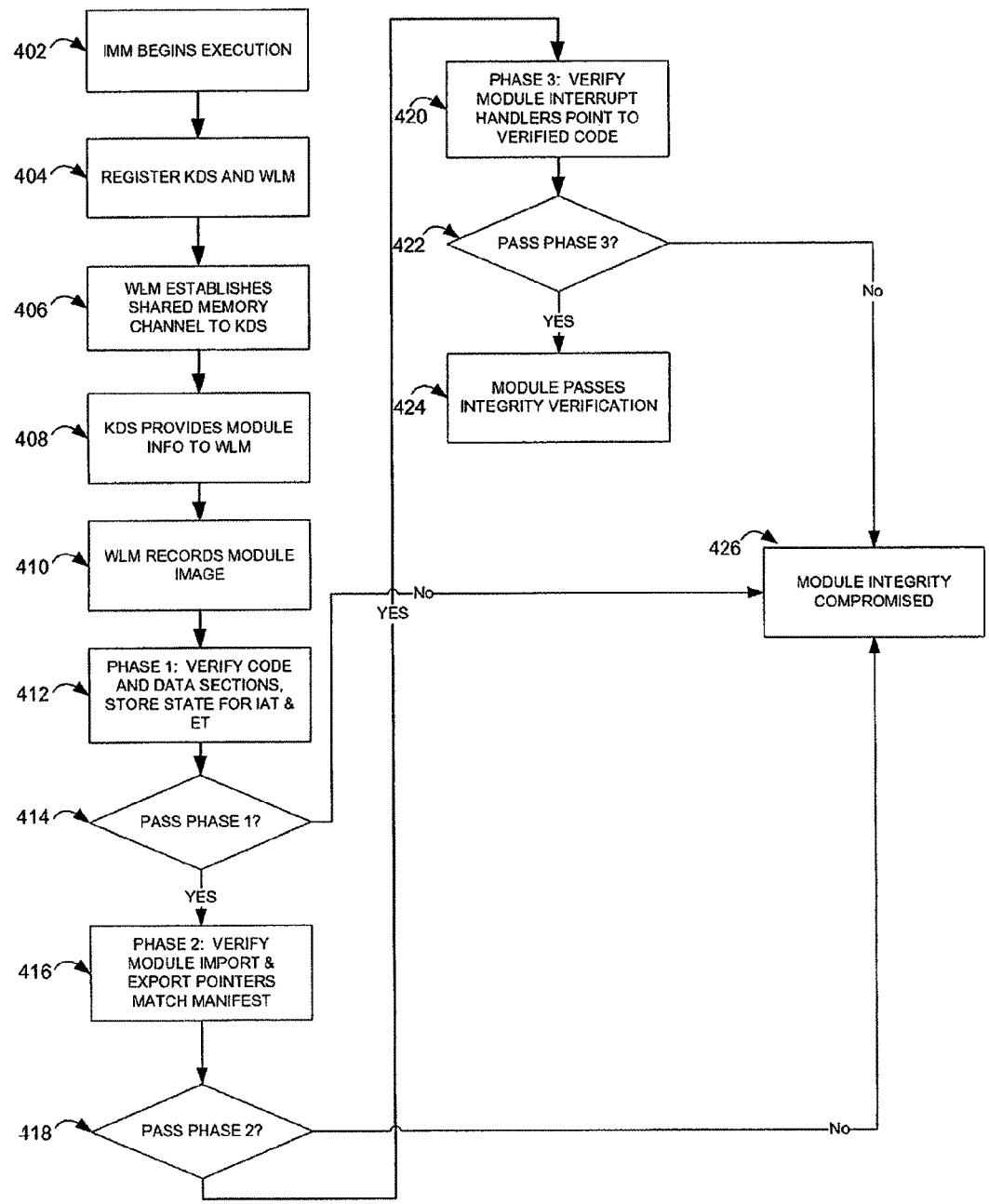
FIG. 4 is a flowchart of a method for whitelisting software components according to an embodiment of the invention.

Reference is now made to FIG. 4 which is a flowchart of a method for validating, checking, or whitelisting software components such as for example component 214 or other such components or modules according to an embodiment of the invention. Embodiments of the method may be used by, or may be implemented by, for example, computing platform 100 of FIG. 1 or by other suitable computing devices capable of hosting executing environment 104. Embodiments of the method may also use the whitelisting architecture of FIG. 2 and the data structure of FIG. 3 for images of components captured by a whitelisting service or other suitable data structures.

As indicated at operation 402, an IMM such as for example IMM 212 may start execution. In some embodiments, a management module such as for example management module 204 may also be operating. For instances in which management module 204 is a VMM, IMM 212 may operate from within and be secured by management module 204. Alternatively, IMM 212 may operate as part of a guest OS, e.g. operating environment 206, and it may register with a VTIS component of management module 204 for protection upon loading. For instances in which management module is not a VMM, IMM 216 may be present in the Management Module firmware in the chipset and may perform all of the functions attributed to a KDS such as for example KDS 216.

In operation 404, a KDS and a WLM such as for example KDS 216 and WLM 218 may register with IMM 212. In operation 406, WLM 218 may establish a shared memory communication channel to communicate with KDS 216. The shared memory channel may depend on whether or not operating environment 206 is virtualized. For instances in which operating environment 206 is virtualized, the shared memory may be a VTIS protected location within the VMM, e.g. management module 204. For other embodiments, the shared memory may be accessible via for example a HECI interface and may be buffered. Other shared memory channels that are protected from components executing in operating environment 206 may also be used.

KDS 216 may use the shared memory channel for communicating to WLM 218 the runtime information, e.g. the virtual base addresses regarding one or more components, e.g. modules, kernel services, or agents, currently executing in operating environment 206 (operation 408). Other runtime information may also be included.

Once WLM 218 has a listing of all modules, in operation 410 it may collect runtime information on and/or record an image, e.g. an operating snapshot of one or more of these modules for verification purposes. The recorded image may include code and data sections, external symbol tables, and relocation information, as well as other appropriate data. In some embodiments, the data may include an import list such as import list 322 and an export table such as export hash table 332. Other information may also be included. In some embodiments, WLM 218 may determine what references should be recorded by loading an on-disk image of the module from for example a binary file stored in a binary image storage such as binary image storage 210. Other storage for on-disk images may also be used. For example, an image may be stored on an external hard drive or other storage device connected to computing platform 100 by a network such as for example network 140.

In operation 412, WLM 218 may call IMM 216 to verify the code and static data sections of the module for integrity. In some embodiments, IMM 216 may use an on-disk image of the module stored in binary image storage 210 to create an integrity manifest for the module being verified. Alternatively, the integrity manifest may be stored for example at another location on network 140 such as a server. IMM 216 may use this manifest to compare with the image or collected runtime information of the module recorded in operation 410 for verification. As part of operation 412, IMM 216 may also verify the code and data sections of dependencies of the module such as for example other modules. The measured values for entries in the import address table (IAT) and export table (ET) may be stored for use in other operations.

If the all of the tested sections successfully pass this initial integrity test (operation 414), then the method may continue with a second verification operation. In operation 416, IMM 216 may verify that the links, e.g. function pointers, between the module and its dependencies are valid. In some embodiments, IMM 216 may compare the ET and IAT entry values collected in operation 410 with an import lookup table (ILT) from the manifest and other data. These export and import values, e.g. offset values, may be determined by obtaining the address of an import or export entry and verifying that the calculated runtime address, e.g. the base address plus the relative virtual address (RVA) falls in the linear address space for the module being verified. All entries in the ILT and their corresponding ET entries may be compared. A check to determine whether entries in the IAT match the runtime addresses calculated from the ILT may also be performed. This verification operation may help ensure that the component is not being hooked by a root-kit.

If the verification of operation 416 is successful (operation 418), then the third verification, operation 420, may be performed. In operation 420, the interrupt handler entries, e.g. pointers, may be compared to the memory locations of verified sections of code, e.g. verified modules or components, as calculated in operation 416 to verify their validity. IMM 216 may read the entries from an interrupt descriptor table (IDT) which may be a data structure that is part of Operating Environment 206 and may be used by the module being verified to store pointers needed when an interrupt or exception may occur during execution of the module being verified. The IDT entries may point to one or more other loaded modules or other executing components of operating environment 206 that may be called during an interrupt. In some embodiments, some or all of the modules executing in operating environment 206 may have been verified by an operation such as operation 416 prior to operation 420. In these instances, IDT pointers that point to modules that have been verified by an operation 416 may be considered valid pointers.

If all of the module interrupt handlers are verified (operation 422), then the module may be considered to have passed integrity verification testing (operation 424). However, if at one or more of operations 414, 418 and 422, the module did not pass the verification tests of operations 412, 416, and 420 respectively, then the module integrity may be compromised (operation 426), e.g. a root-kit or other malware may be affecting proper operations in operating environment 206. In these instances, an alert may be sent or other appropriate responsive action may be taken.

Operations 406-426 may be repeated for each component or module operating in operating environment 206 to insure that the security of operating environment 206 is intact. For other components that may be loaded subsequently, these operations may be executed for the new component or all components upon loading or other such event. Additionally, operations 406-426 may also be repeated in response to other triggering events such as for example system reboot, changes to IDT, etc.

Other operations or series of operations may be used. Further, other numbers or types of integrity or verification checks may be used.

While the invention has been described with respect to a limited number of embodiments, it will be appreciated that many variations, modifications and other applications of the invention may be made. Embodiments of the invention may include a computer readable medium, such as for example a memory, a disk drive, or a USB or other flash memory, including instructions which when executed by a processor or controller, carry out methods disclosed herein. Embodiments of the present invention may also include other systems for performing the operations herein. Such systems may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
executing a first software component loaded in a first operating environment;
collecting runtime information in the first operating environment about the first software component, wherein the collected runtime information includes one or more of code, data, external symbol tables, and relocation information, including storing a set of state data for an import address table and export pointers of the first software component;
communicating the collected runtime information to a second software component in a second operating environment, the second operating environment isolated from the first operating environment;
comparing the collected runtime information with a validated set of information about the first software component, including comparing the state data with the validated set of information about the first software component; and
sending an alert if the collected runtime information does not match the validated set of information.

2. The method of claim 1, comprising:
reading a set of validated interrupt handler entries from storage;
verifying that a recorded set of interrupt handler entries point to the validated import and export offsets.

3. The method of claim 1, comprising verifying one or more dependent software components of the first software component.

4. The method of claim 1, wherein the first operating environment is virtualized and the second operating environment is a virtual machine manager.

5. The method of claim 1, wherein the first operating environment is a non-virtualized operating system.

6. The method of claim 1, wherein communicating the collected runtime information comprises communicating the collected runtime information via a shared memory in the second operating environment.

7. A system comprising:
a first software component to execute in a first operating environment;
a second software component to execute in the first operating environment, to collect runtime information about the first software component, wherein the collected runtime information includes one or more of code, data, external symbol tables, and relocation information, to store a set of state data for an import address table and export pointers of the first software component, and to communicate the collected runtime information; and
a third software component to execute in a second operating environment, the second operating environment isolated from the first operating environment, the third component to receive the collected runtime information, and to compare the collected runtime information with a validated set of information about the first software component, including to compare the state data with the validated set of information about the first software component.

8. The system of claim 7, wherein:
the third software component is to read a set of validated interrupt handler entries from storage; and to verify that a recorded set of interrupt handler entries point to the validated import and export offsets.

9. The system of claim 7, wherein:
the third software component is to verify one or more dependent software components of the first software component.

10. The system of claim 7, wherein the first operating environment is virtualized.

11. The system of claim 7, wherein the first software component communicates the collected runtime information via a shared memory in the second operating environment.

12. A computer-readable storage medium having stored thereon instructions that, if executed by a processor, cause the processor to perform a method comprising:
executing a first software component loaded in a first operating environment;
collecting runtime information in the first operating environment about the first software component, wherein the collected runtime information includes one or more of code, data, external symbol tables, and relocation information, including storing a set of state data for an import address table and export pointers of the first software component;
communicating the collected runtime information to a second software component in a second operating environment, the second operating environment isolated from the first operating environment;
comparing the collected runtime information with a validated set of information about the first software component, including comparing the state data with the validated set of information about the first software component; and
sending an alert if the collected runtime information does not match the validated set of information.

13. The computer-readable storage medium of claim 12, comprising instructions that, if executed by a processor, cause the processor to:
read a set of validated interrupt handler entries from storage;
verify that a recorded set of interrupt handler entries point to the validated import and export offsets.

14. The computer-readable storage medium of claim 12, comprising instructions that, if executed by a processor, cause the processor to
verify one or more dependent software components of the first software component.

* * * * *